July 3, 1928.
R. W. JOHNSON
1,676,090
MEANS FOR STERILIZING LIGATURE TUBES
Filed Dec. 21, 1927
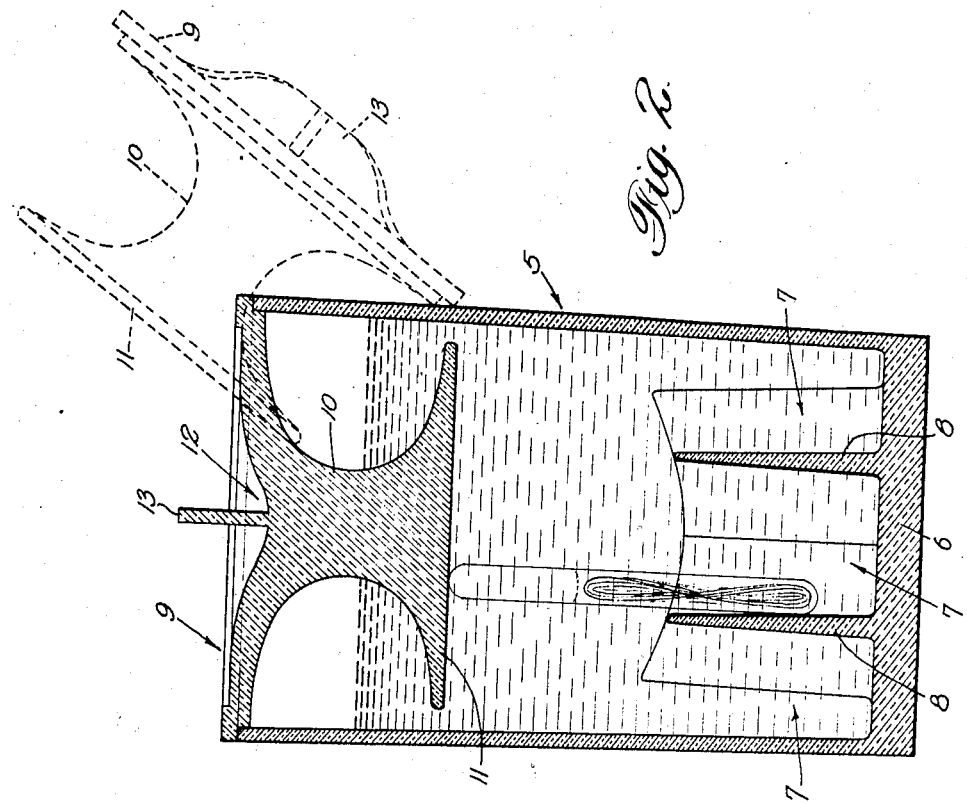
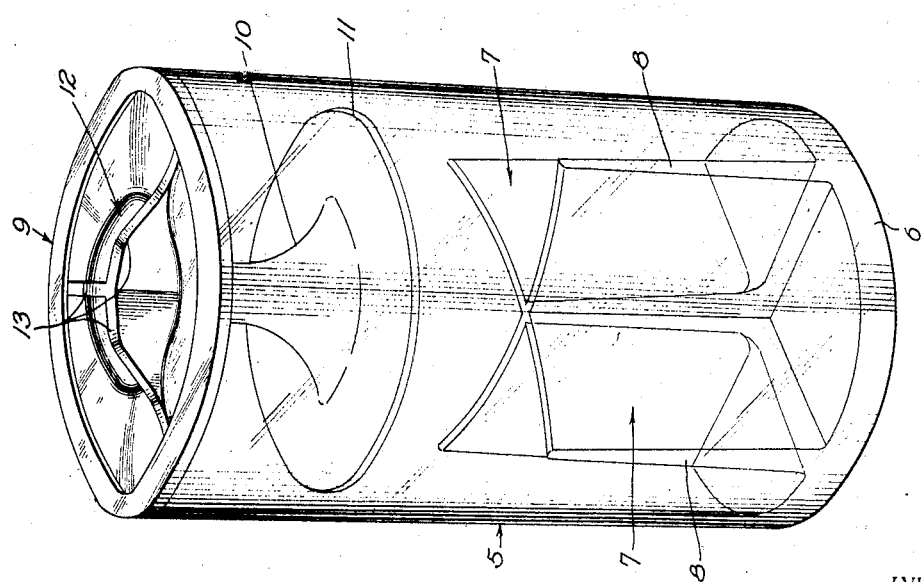
INVENTOR.
ROBERT W. JOHNSON.
BY
ATTORNEY.

Patented July 3, 1928.

1,676,090

UNITED STATES PATENT OFFICE.

ROBERT W. JOHNSON, OF NEW BRUNSWICK, NEW JERSEY, ASSIGNOR TO JOHNSON & JOHNSON, OF NEW BRUNSWICK, NEW JERSEY, A CORPORATION OF NEW JERSEY.

MEANS FOR STERILIZING LIGATURE TUBES.

Application filed December 21, 1927. Serial No. 241,562.

My invention relates to hospital accessories and more particularly to a system and means for insuring complete sterilization of elements such as sealed glass tubes containing storage fluid and catgut or other ligatures.

Sterilization is imperative prior to rupture of the tubes and heretofore the nurse or other attendant, in accomplishing this task, has had recourse to any means conveniently at hand, usually a shallow pan or receptacle which contains the bath and the tubes. This practice suffers the disadvantage that the tubes tend to float and not being fully submerged it is evident that there will be dry areas unsterilized and, hence, grave sources of contamination. Moreover, inasmuch as the tubes are wholly at large swimming about in the bath, the nurse has to fish for them with forceps, and the situation is aggravated when she has to grasp a particular tube. This condition not only is vexatious, it is serious where time is highly important, as in the performance of major operations.

Objects of the invention are to supplant the described practice by a system and means which will insure complete sterilization of the tubes as well as such orderly arrangement or address that the tubes may be selectively withdrawn from the bath with facility and despatch.

The nature, characteristic features and scope of the invention will more readily be understood from the following description taken in connection with the accompanying drawing, wherein Figure 1 is a perspective view of the improved storage and sterilizing vessel.

Figure 2 is a vertical sectional view of the same.

According to my invention, I provide a receptacle 5 of ceramic ware or glass and preferably the latter on account of its transparency; said receptacle being of straight cylindrical form or at any rate having a mouth portion free from angles or obstructions and relatively wide. The side wall of the jar or receptacle is of substantial thickness and the bottom 6 is even heavier to provide for the support and carriage of cross walls or partitions which divide the jar into a plurality of compartments 7. It is of economical advantage to cause the walls 8 to spring integrally from the bottom and sides of the jar, or in short to be cast or molded as a unit therewith. In this practice, the partition walls will be wedge form in section and their upper marginal walls will be depressed, that is to say inclined towards the major axis of the jar.

In practice, sealed glass tubes containing ligatures and storing fluid are disposed endwise in the various compartments 7, according to the nature, classification, etc., and subjected to the sterilizing action of a solution of carbolic acid or other suitable agent.

To insure that result, a glass cover 9 is formed with a central depending neck 10 terminating in a disk or collar 11 which extends far enough to constitute an immerser for the ligature tubes. In fact, the invention contemplates keeping the disk or immerser 11 below the fluid level so as to insure the positive wetting or sterile bathing of the tubes.

The neck and its integral collar are of comparatively heavy section and to insure against breakage, the top of the cover is depressed, as at 12, and equipped with integral radial arms 13 which merging at a common center, bolster the cover and also constitute a convenient handle.

The general shape or construction of the cover, that is to say opposed disks or heads integrally joined by an axial element or neck, simplifies the handling of the cover when a tube is to be removed. For example, it is only necessary to rock the cover by causing the neck to straddle the upper edge of the jar, under which conditions the cover abuts the outside of the jar and the immerser engages the upper margin thereof, with ample clearance for the introduction of the hand and forceps.

Having described my invention, I claim:

1. An appliance for the purpose stated, comprising a receptacle for a sterilizing fluid and for ligature storage tubes, means in the receptacle for endwise stowage of tubes according to classification, and a cover for the receptacle having a follower extending below the level of the fluid and operating to keep the tubes submerged.

2. An appliance as set forth in claim 1, wherein the cover and follower are joined by an integral neck which may be availed of to rock or support the cover on the upper marginal wall of the receptacle.

3. An appliance as set forth in claim 1, wherein the means for classifying the tubes is formed by cross walls integrally springing from the bottom and side walls of the receptacle.

In testimony whereof I affix my signature.

ROBERT W. JOHNSON.